US007983014B2

(12) United States Patent
Shibayama et al.

(10) Patent No.: US 7,983,014 B2
(45) Date of Patent: Jul. 19, 2011

(54) DISCONNECTOR AND OVERVOLTAGE PROTECTION DEVICE

(75) Inventors: Masao Shibayama, Miyagi (JP);
Hitoshi Kijima, Saitama (JP)

(73) Assignee: Hitoshi Kijima, Saitama (JP)

( * ) Notice: Subject to any disclaimer, the term of this patent is extended or adjusted under 35 U.S.C. 154(b) by 120 days.

(21) Appl. No.: 12/309,431

(22) PCT Filed: Jul. 17, 2007

(86) PCT No.: PCT/JP2007/064111
§ 371 (c)(1),
(2), (4) Date: Jan. 15, 2009

(87) PCT Pub. No.: WO2008/010495
PCT Pub. Date: Jan. 24, 2008

(65) Prior Publication Data
US 2009/0323242 A1    Dec. 31, 2009

(30) Foreign Application Priority Data
Jul. 19, 2006    (JP) .................................. 2006-196650

(51) Int. Cl.
*H02H 3/00*    (2006.01)
(52) U.S. Cl. ............................ 361/94; 361/42; 361/93.1
(58) Field of Classification Search .................. 361/131, 361/117, 132, 133, 91.1, 97, 60, 88, 89, 110, 361/42, 93.1, 94
See application file for complete search history.

(56) References Cited

U.S. PATENT DOCUMENTS

| 3,040,212 | A | * | 6/1962 | Hermann et al. ............... 361/40 |
| 3,480,834 | A | | 11/1969 | Billings |
| 3,846,675 | A | | 11/1974 | Shimp |
| 3,851,216 | A | * | 11/1974 | Clarke et al. .................... 361/31 |
| 3,881,766 | A | * | 5/1975 | Pratsch .......................... 361/115 |
| 3,992,649 | A | * | 11/1976 | Kotheimer et al. ............. 361/63 |
| 5,808,844 | A | * | 9/1998 | Schiel et al. .................... 361/45 |
| 6,987,657 | B2 | * | 1/2006 | Domejean et al. ............. 361/117 |

FOREIGN PATENT DOCUMENTS

| EP | 0 350 477 | 1/1990 |
| JP | S57-135836 | 8/1982 |
| JP | S62-095433 | 6/1987 |
| JP | S63-290122 | 11/1988 |
| JP | H04-372519 | 12/1992 |
| JP | H09-093790 | 4/1997 |
| JP | 2000-102158 | 4/2000 |

OTHER PUBLICATIONS

Nakajima, Hiroichi, "How to Select and Use Breakers and Switchgears," Ohmsha (2005), Chapter 6, pp. 116-121.
Extended European Search Report issued Oct. 5, 2010 for corresponding European patent application No. 07 790 873.9.

* cited by examiner

*Primary Examiner* — Patrick Salce
(74) *Attorney, Agent, or Firm* — David N. Lathrop

(57) ABSTRACT

The disconnector of the present invention comprises: a current transformer that detects a current flowing through electric wires; a rectifying part that rectifies the current outputted from the current transformer; a charging part that charges the current outputted from the rectifying part; a switching part that disconnects the electric wires upon driving; and a trigger part that drives the switching part when the charge stored in the charging part becomes a predetermined drive area. In this regard, the drive area is set larger than the charge that can be stored in the charging part by a lightning surge current. The disconnector of the present invention and the overvoltage protectors may be combined to constitute the overvoltage protection device.

10 Claims, 17 Drawing Sheets

DISCONNECTOR AND OVERVOLTAGE PROTECTION DEVICE

TECHNICAL FIELD

The present invention relates to a disconnector that conducts a current generated by lightning and that blocks a current from a commercial power supply and an overvoltage protection device combining the disconnector with overvoltage protectors.

BACKGROUND ART

Examples of blocking means for changing one or a plurality of electric wires from a conductive state to a blocked state when an overcurrent flows include a circuit breaker, a fuse, a residual current device, and a compound of a circuit breaker and a residual current device (Non-patent literature 1). FIG. 1 is a block diagram of a representative circuit breaker shown in a product catalog (electronic circuit breaker) of the present applicant. FIG. 2 is a diagram showing operating characteristics of a circuit breaker 900 shown in FIG. 1. The horizontal axis of FIG. 2 denotes current value (%) where the current rating of a power current at a commercial frequency is set to 100%, and the vertical axis denotes operating time (seconds, minutes). Thus, the circuit breaker does not operate when the current value is at the current rating 100%. Blocking is possible for several seconds to several minutes when the current value is, for example, twice the current rating (200%). In FIG. 1, the circuit breaker 900 is constituted by: electric wires 991, 992, and 993; current transformers (CT) 901, 902, and 903 that detect current flowing in the electric wires 991, 992, and 993; a rectifier circuit 910 that rectifies output current from the current transformers 901, 902, and 903; circuits 920 and 930 that output information of each operating condition; a switchgear 962 that is connected in series to the electric wires 991, 992, and 993 and that can disconnect the electric wires; a trip coil 961 that drives the switchgear 962; a trigger circuit 950 that applies a current to the trip coil 961 based on the information from the circuits 920 and 930; and the like. Several terminals are used to set the operating conditions, thereby various operating characteristics as shown in FIG. 2 can be obtained.

FIG. 3 shows a relationship between the current flowing through the electric wires and the output voltage of a current transformer when the load impedance is connected to the current transformer. The horizontal axis denotes the current flowing through the electric wires detected by the current transformer. When the current flowing through the electric wires is low, the effective value and the peak value of the output voltage of the current transformer are proportional to the current (linear region). Therefore, when the current is a commercial alternating current, the output from the current transformer is like a sine wave. However, as the current flowing through the electric wires becomes high, the effective value of the output voltage of the current transformer is not proportional to the current (nonlinear region). Even in the nonlinear region, it can be seen that the peak value becomes large as the current becomes high. Therefore, the nonlinear region does not result in a sine wave as shown in FIG. 3, even if the current flowing through the electric wires is a commercial alternating current. In case of the circuit breaker, the current transformers are designed to be operable in the linear region to ensure the operating characteristics as shown in FIG. 2. In other words, because current transformers with large core shapes are used to avoid magnetic saturation, the current transformers become large.

FIG. 4A shows an installation method of the circuit breaker. The circuit breaker is usually installed between the power side and the load side. The operating characteristics shown in FIG. 2 indicate operating characteristics required when the circuit breaker is installed as in FIG. 4A.

FIG. 4B shows an installation method of a fuse. The fuse is usually installed between the power side and the load side. An object of the circuit breaker and the fuse is to block the current of a commercial power supply when the current exceeds a desired value to prevent fire or the like.

FIG. 5 shows an example of an overvoltage protection device constituted by combining the circuit breaker with overvoltage protectors. An overvoltage protection device 2000 is constituted by overvoltage protectors 801, 802, and 803, the circuit breaker 900, and the like. There are various types of the overvoltage protectors 801, 802, and 803 which are generally constituted by discharge tubes, varistors, and the like. The overvoltage protectors 801, 802, and 803 are usually high impedance (state that the current does not flow). When a lightning surge voltage is applied between electric wires connecting the power side and the load side and the ground 890, the overvoltage protectors 801, 802, and 803 become low impedance and become substantially short circuited (state that the lightning surge current flows). Therefore, the lightning surge current is discharged to the ground 890. However, even if there is no more lightning surge current, the state of the low impedance of the overvoltage protectors may continue, and the commercial power supply may continue to flow into the ground 890. The current of the commercial power supply still flowing when there is no more lightning surge current will be called a follow current. The circuit breaker 900 of FIG. 5 is connected in series to the overvoltage protectors 801, 802, and 803 to block the follow current. An example of the method for blocking the follow current includes a method using fuses 821, 822, and 823 as shown in FIG. 6. Conventionally, as a method for blocking the follow current of the overvoltage protectors, a circuit breaker or fuses that primarily block the current when the current of the commercial power supply becomes excessive have been alternatively used.

When the circuit breaker or the fuses are alternatively used, the lightning surge current may cause malfunction and disconnection of the circuit breaker or the fuses, and lightning surge current may not be able to be released to the ground 890. Meanwhile, if a circuit breaker and fuses with high current rating are used to avoid the disconnected state under the lightning surge current, the follow current lower than the current rating cannot be blocked. Furthermore, the circuit breaker or the fuses become large. Although, there has been such a problem conventionally, conventional overvoltage protectors could only handle lightning surge peak current of up to about 10 kA. Therefore, the circuit breaker or the fuses could only handle lightning surge peak current of up to about 10 kA. There were many examples of alternatively using circuit breaker or fuses with current rating of about 20 A or 30 A that can withstand the lightning surge peak current. In that case too, there was a problem that the follow current below the current rating could not be blocked. However, the maximum value of the lightning surge current flowing in one electric wire is about 50 kA, and overvoltage protectors of 50 kA or more have been developed that are used where the lightning surge current flows. When alternatively using a circuit breaker or fuses that can withstand the lightning surge current of 50 kA and that can avoid disconnection, a circuit breaker or fuses with 100 A or more of current rating need to be selected. If the current rating is increased this way, blocking of a high follow current also becomes impossible. Problems caused by increasing the current rating have become apparent, such as the electric wires may burn out and a physically large circuit breaker or fuses are necessary.

Other than the circuit breaker or the fuses, there are residual current devices as means for blocking. FIG. 7 is a functional configuration example of a residual current device shown in Non-patent literature 1 (FIG. 6.5, p. 120). A residual current device 700 is constituted by a zero phase current transformer (ZCT) 701 that detects the vector sum of the currents flowing through a plurality of electric wires, an amplifier 710 that amplifies an output from the ZCT 701, a switchgear 762 connected to the electric wires in series and capable of disconnecting the electric wires, a trip coil 761 that drives the switchgear 762, a switching part 750 that applies a current to the trip coil 761 based on the output from the amplifier 710, and the like. When the follow current occurs in one overvoltage protector (in case of one-wire earth fault), the ZCT 701 of the residual current device 700 can detect even a low current. When the low impedance state occurs in two or more overvoltage protectors (in case of two-wire earth fault or three-wire earth fault), two or three electric wires are short circuited through the connection to the same ground 890 (interphase short circuit). In case of the interphase short circuit, the directions of the currents of two or three electric wires are opposite. In such a case, since the currents cancel each other, the ZCT 701 cannot detect the follow current. Therefore, the residual current device cannot be used as a disconnector for the overvoltage protection device.

Non-patent literature 1: "How to Select and Use Breakers and Switchgears" by Hiroichi Nakajima, Ohmsha, Chapter 6 How to Select and Use Low-Voltage Breakers, pp. 116-121.

DISCLOSURE OF THE INVENTION

Problem to be Solved by the Invention

An object of the present invention is to provide a disconnector that satisfies flowing a lightning surge current, blocking a current from a commercial power supply both in cases of earth fault and interphase short circuit, and being compact in size and an overvoltage protection device combining the disconnector with overvoltage protectors.

Means to Solve the Problems

A disconnector of the present invention comprises: a current transformer (CT) that detects a current flowing through electric wires; a rectifying part that rectifies the current outputted from the current transformer; a charging part that charges the current outputted from the rectifying part; a switching part that disconnects the electric wires upon driving; and a trigger part that drives the switch when the charge stored in the charging part becomes a predetermined drive area. In this regard, the drive area is set larger than the charge that can be stored in the charging part by a lightning surge current. The "charge that can be stored in the charging part by the lightning surge current" denotes a charge multiplying the charge that is determined by the maximum lightning surge current that may flow where the disconnector of the present invention is used or that is determined by the maximum lighting surge current that the overvoltage protectors used in combination with the disconnector of the present invention can handle, by the current transformation ratio of the current transformer.

In the current transformer, when the current flowing through the electric wires is in a range that the trigger part drives the switch, the relationship between the current and the voltage outputted when all circuit parts connected to the current transformer are load impedance may be nonlinear. The switch may be operated by a current that discharges the charge stored in the charging part. The disconnector may comprise a ZCT that detects the vector sum of the currents flowing through a plurality of electric wires and a bypass part that can set a state that the charge is not stored in the charging part when there are a plurality of electric wires, and may also comprise a current vector sum detecting part that puts the bypass part in a state in which the charge is not stored in the charging part when the output of the ZCT is in a predetermined range. The disconnector may also comprise a delay part that delays the start of charging of the charging part.

Furthermore, the overvoltage protection device of the present invention is constituted by combining the disconnector and the overvoltage protectors.

Effects of the Invention

According to the disconnector of the present invention, the lightning surge current is flown because the drive area where the trigger part drives the switching part is set to an area larger than the charge that can be stored in the charging part by the lightning surge current. The current of the commercial power supply can be blocked both in cases of earth fault and interphase short circuit because the charging part can store the current from the continuously flowing commercial power supply. The current transformer can be miniaturized because the current transformer can be used in the nonlinear region. The overvoltage protection device can be provided because the disconnector can be combined with the overvoltage protectors. Furthermore, the disconnector of the present invention is not affected by the voltage variation of the commercial power supply due to the lightning surge superposition or the like because the disconnector is not supplied with a power supply from the commercial power supply.

BEST MODE FOR CARRYING OUT THE INVENTION

Figure 1:
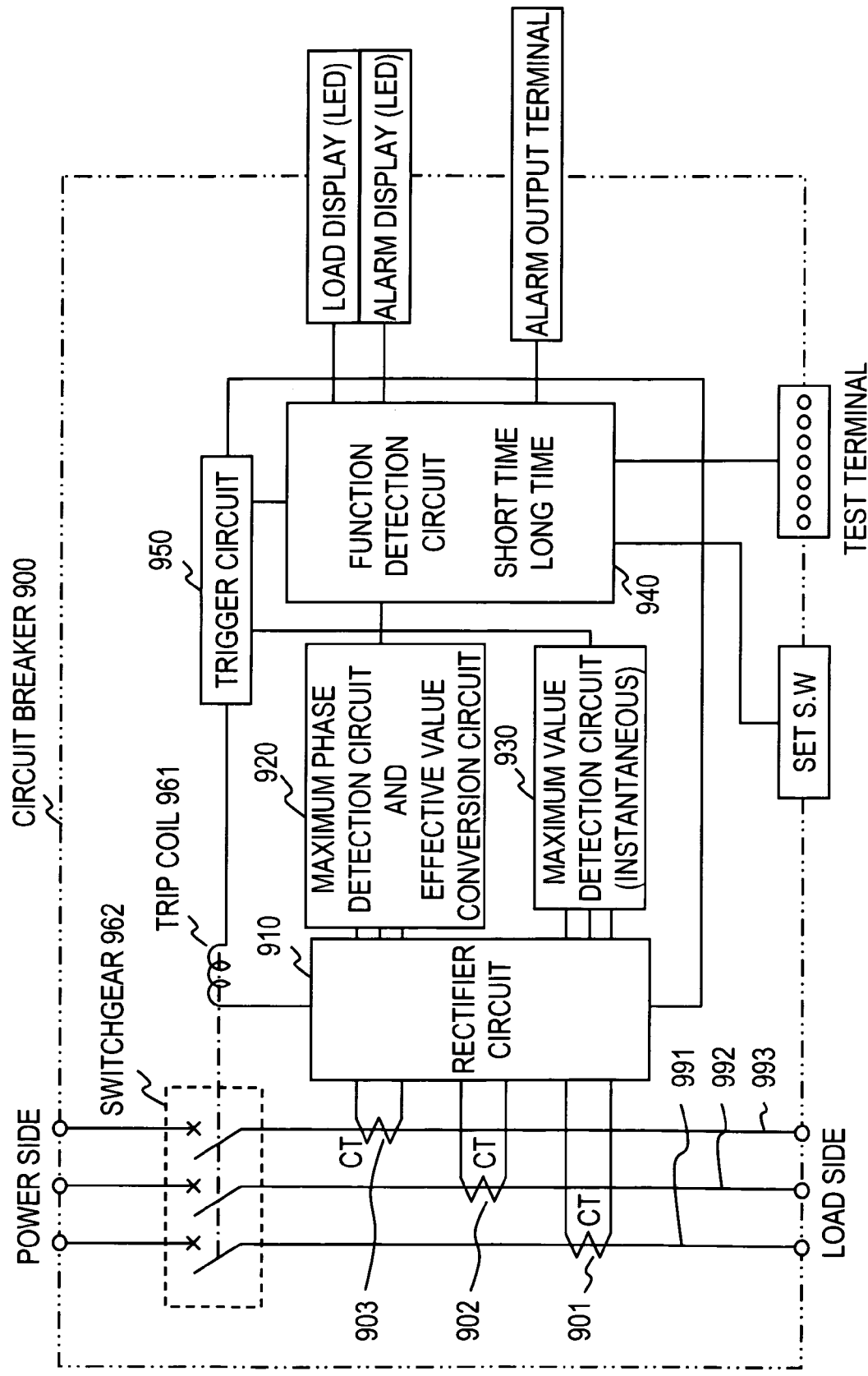
FIG. 1 is a block diagram of a representative circuit breaker.

The present invention will now be described. Constituting parts having the same functions are designated with the same reference numerals, and the description will be omitted.

Figure 8:
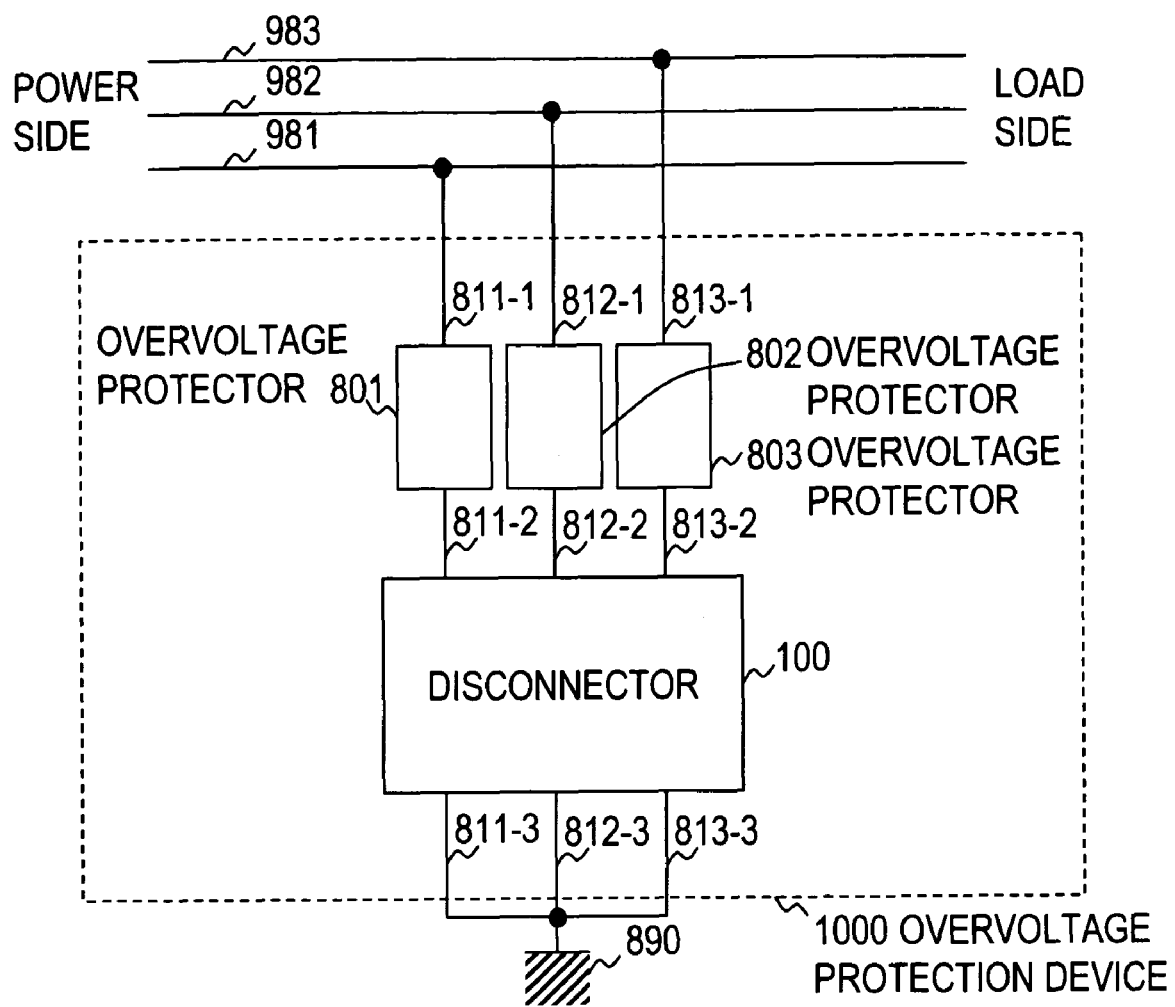
FIG. 8 is a diagram showing a configuration example of an overvoltage protection device combining the disconnector and the overvoltage protectors.

First, functional conditions required for a disconnector used in combination with overvoltage protectors will be organized. FIG. 8 is a configuration example of an overvoltage protection device 1000 combining the disconnector of the present invention and the overvoltage protectors. Although a disconnector 100 needs to be connected in series to overvoltage protectors 801, 802, and 803 between electric wires 981, 982, and 983 and a ground 890, the order does not affect the performance. Three electric wires 981, 982, and 983 are wired from the power side to the load side. This is an example of a three-phase AC, and in case of a single-phase AC, two electric wires are used. The overvoltage protectors 801, 802, and 803 are connected to the electric wires through electric wires 811-1, 812-1, and 813-1. The disconnector 100 is connected to the overvoltage protectors 801, 802, and 803 through electric wires 811-2, 812-2, and 813-2. Furthermore, the disconnector 100 is grounded through electric wires 811-3, 812-3, and 813-3. When a lightning surge current is generated, the overvoltage protectors are short circuited to protect devices on the load side and release the lightning surge current to the ground 890. Therefore, the disconnector 100 must flow the lightning surge current. Although the lightning surge current is a current that is several 10 kA at the maximum, the maximum current that may flow into the disconnector 100 is small depending on the use environment or the combination with other lightning surge protecting means. There are various standards for the overvoltage protectors, and the maximum current that the overvoltage protectors can flow is determined by specifications of the overvoltage protectors. Thus, it is preferable that the disconnector 100 can flow the maximum lightning surge current that may possibly flow. However, since the lightning surge current instantaneously (several 10 μseconds to several 100 μseconds) flows, the charge (time integration value of current) is relatively small, which is several coulombs at the maximum.

Figure 9:
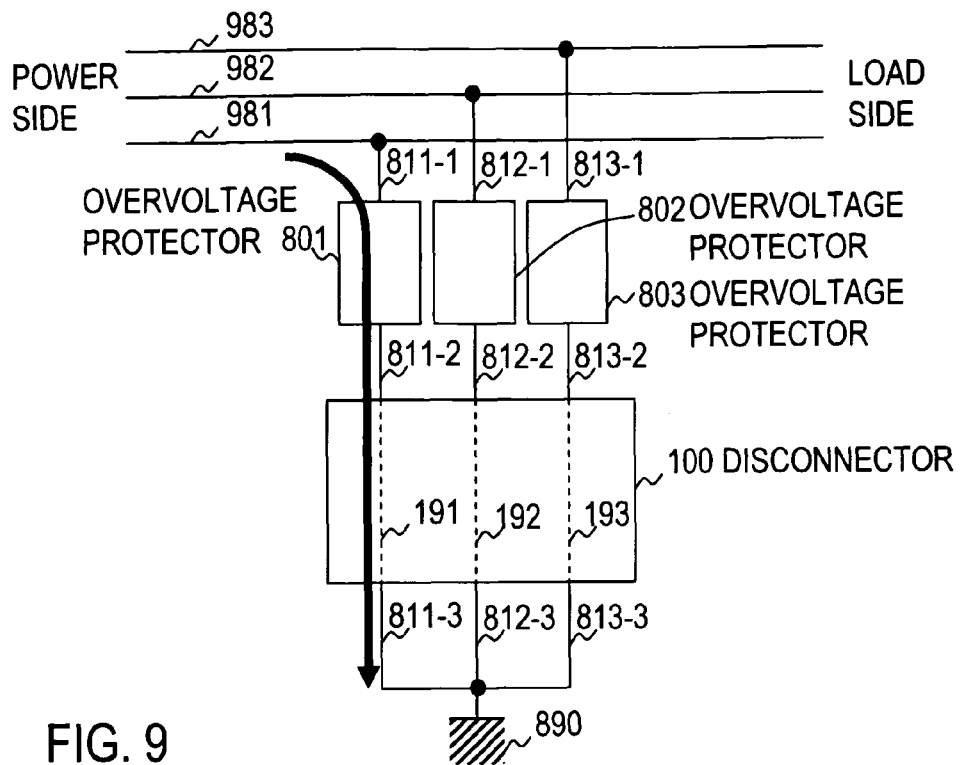
FIG. 9 is a diagram showing that a follow current is generated in one overvoltage protector (one-wire earth fault)
Figure 10:
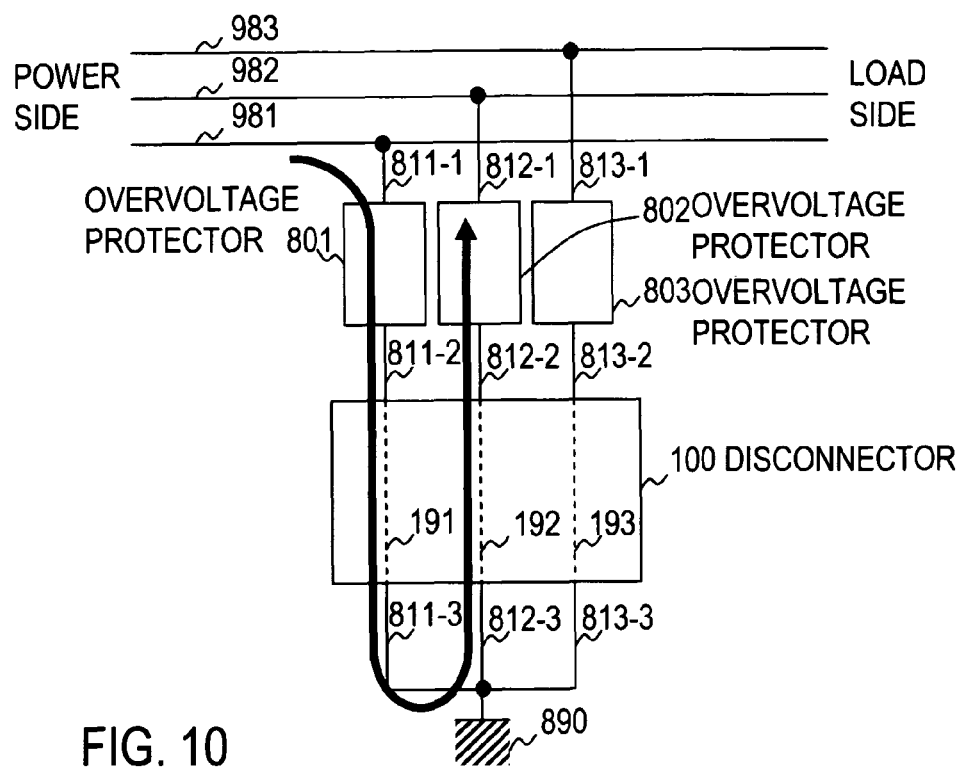
FIG. 10 is a diagram showing that a follow current is generated in two overvoltage protectors (two-wire earth fault, i.e., interphase short circuit)

When there is no more lightning surge current, the overvoltage protectors need to be returned to the disconnected state to flow the commercial power supply to the load side. However, for example, when discharge tubes are used as the overvoltage protectors, once the discharge occurs, the discharge may be continued by the commercial power supply. The phenomenon that the low impedance state of the overvoltage protectors continues even when there is no more lightning surge current and the commercial current flows into the ground 890 is called follow current. The disconnector 100 needs to block the follow current. FIG. 9 is a diagram showing that the follow current is generated in one overvoltage protector (one-wire earth fault). FIG. 10 is a diagram showing that the follow current is generated in two overvoltage protectors (two-wire earth fault, i.e., interphase short circuit). As shown in FIG. 9, when one overvoltage protector 801 is short-circuited, the current flowing into the ground 890 through the electric wires 811-1 to 811-3 is relatively low. Generally, the current would be several A to several 10 A because there is ground resistance in the ground 890. Meanwhile, as shown in FIG. 10, when both of the overvoltage protectors 801 and 802 are in a low impedance state, i.e. short-circuited, a high current flows because the overvoltage protectors 801 and 802 are short-circuited (interphase short circuit) through the electric wires 981 and 982. Generally, the current would be several 100 A to several 1000 A. The disconnector 100 needs to block the current in both cases. However, in case of commercial power supply, since the current continuously flows, the charge (time integration value of current) in either cases of the follow current tends to be larger than the charge flown due to the lightning surge current.

First Embodiment

Figure 11:
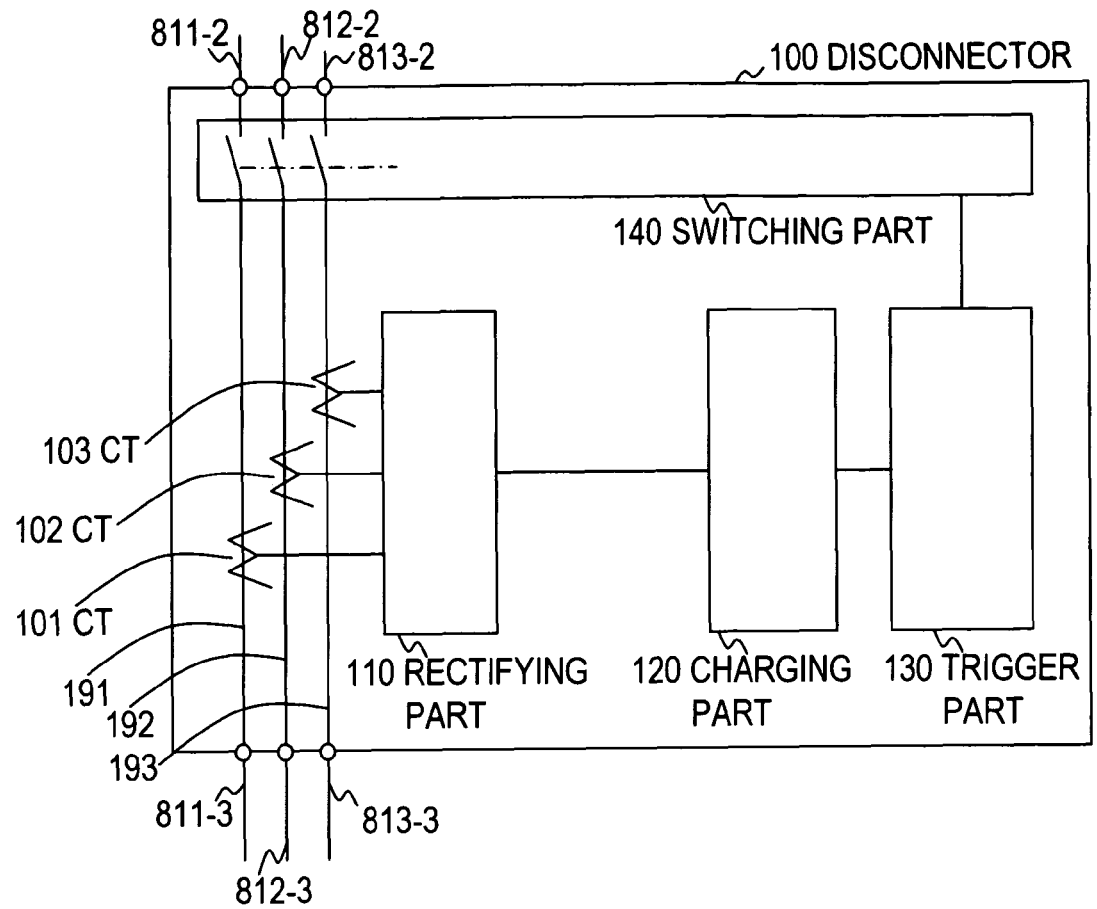
FIG. 11 is a diagram showing a functional configuration example of the disconnector of a first embodiment.
Figure 12:
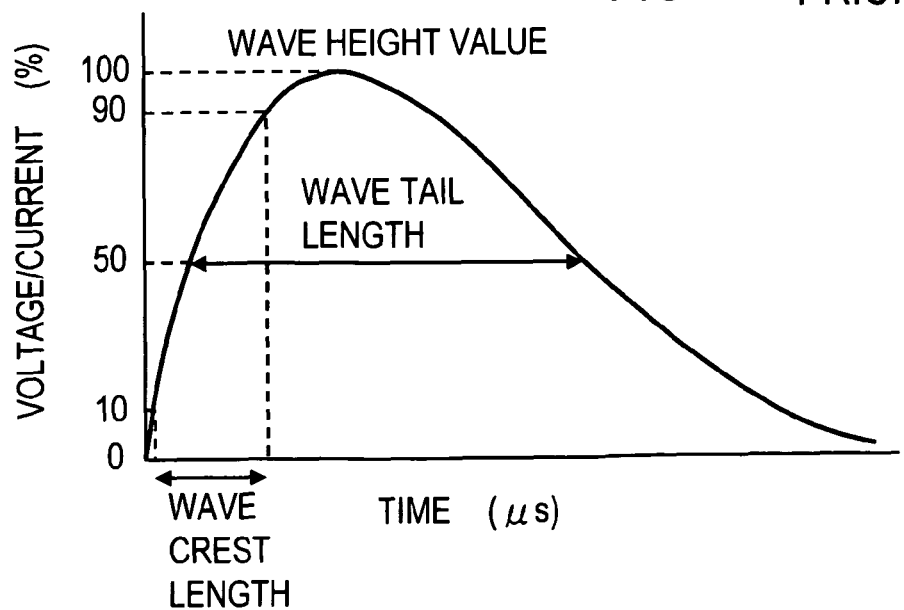
FIG. 12 is a diagram showing a waveform of a lightning surge current.

FIG. 11 shows a functional configuration example of a disconnector of a first embodiment. The disconnector 100 is constituted by: electric wires 191, 192, and 193 for connection with external electric wires; current transformers (CT) 101, 102, and 103 that detect current flowing through the electric wires 191, 192, and 193; a rectifying part 110 that rectifies current outputted from the CTs 101, 102, and 103; a charging part 120 that chares current outputted from the rectifying part 110; a switching part 140 that disconnects the electric wires upon driving; and a trigger part 130 that drives a switch when the charge stored in the charging part becomes a predetermined drive area. In this regard, the drive area is set larger than the charge that can be stored in the charging part by the outputted voltage when all circuit parts connected to the current transformers (CT) under the lightning surge current are load impedance. The "charge that can be stored in the charging part by the voltage outputted by the current transformers (CT) under the lightning surge current" is provided by a time integration of current flowing through the charging part by the voltage in the linear region or the nonlinear region outputted by the current transformers (CT) 101, 102, and 103 under the lightning surge current. The lightning surge current is determined by, for example, a standard of the maximum lightning surge current that may flow where the disconnector 100 is used or a standard of the maximum lightning surge current of the overvoltage protectors 801, 802, and 803. FIG. 12 shows a waveform (temporal change) of the lightning surge current. Since the waveform of the lightning surge current is usually a waveform shown in FIG. 12, the charge can be envisaged to some extent once the maximum lightning surge current is determined. In the harshest conditions, the maximum current is about 50 kA, and the wave tail length is several 100μseconds. The maximum current is about 10 kA in some of the specifications of the overvoltage protectors. In such overvoltage protectors, the overvoltage protectors are broken when the surge current of several 10 kA flows, and the surge current ceases to flow. Therefore, when thinking about the performance of the disconnector 100, the performance significantly exceeding the specifications of the overvoltage protectors is not necessary.

Figure 13:
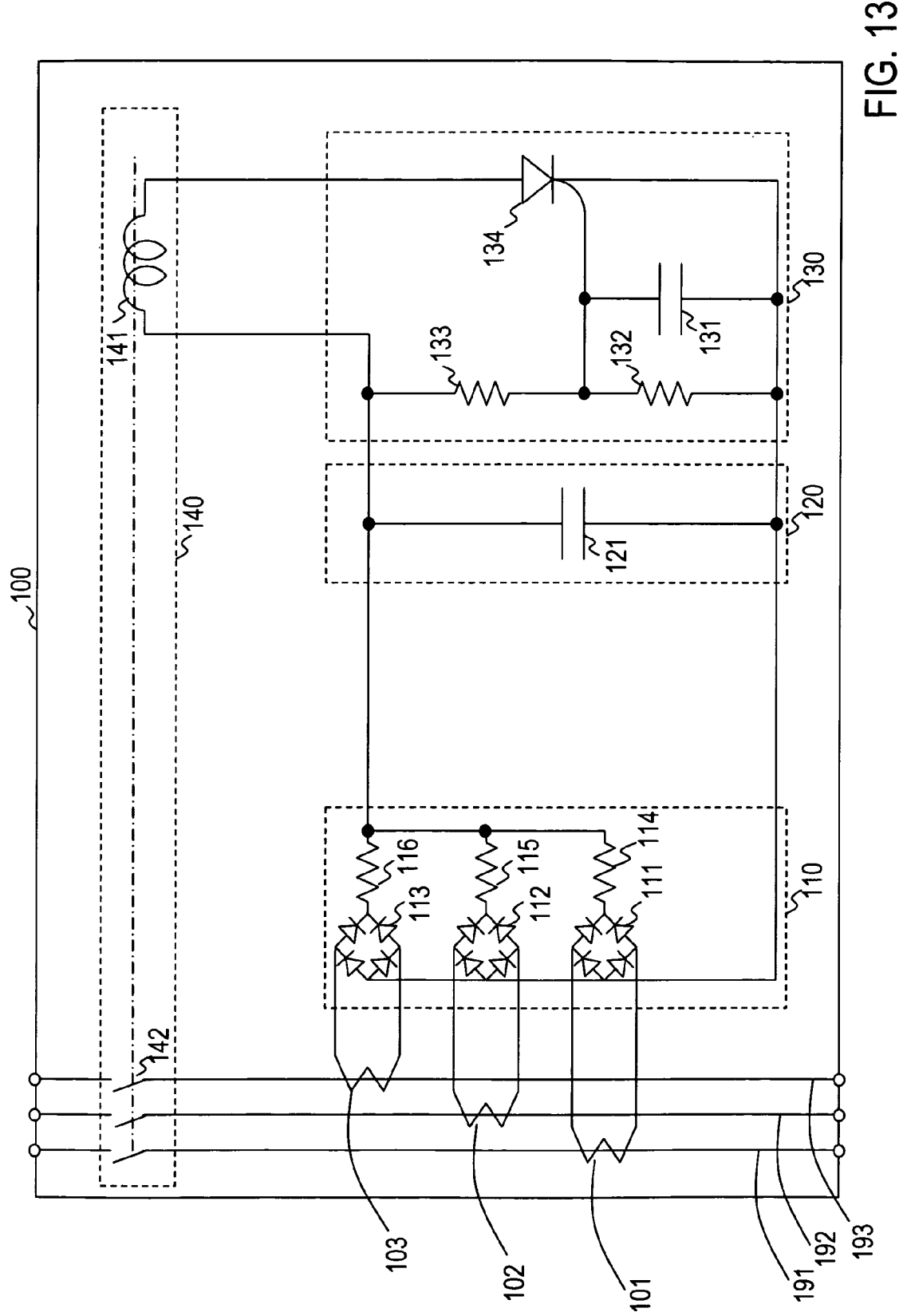
FIG. 13 is a diagram showing a specific configuration example of the disconnector of the first embodiment.

FIG. 13 is a diagram showing a specific configuration example of the disconnector 100. The rectifying part 110 is constituted by diodes 111, 112, and 113 and resistances 114, 115, and 116. The charging part 120 is constituted by a capacitor 121. The trigger part 130 is constituted by a capacitor 131, resistances 132 and 133, and a thyristor 134. The switching part 140 is constituted by a trip coil 141 and a switchgear 142. The lightning surge current, the follow current, or the sum of the lightning surge current and the follow current that is detected by the CTs 101, 102, and 103 and that flows through the electric wires 191, 192, and 193 is rectified and charged to the capacitor 121 of the charging part 120. However, the output voltage from the rectifying part 110 is equal to or lower than the maximum voltage generated by any of the CTs 101, 102, and 103. Furthermore, the maximum value of the voltage of the capacitor 121 is the output voltage from the rectifying part 110. Thus, the charge stored in the capacitor 121 is also equal to or lower than the product of the capacity of the capacitor and the maximum voltage that any of the CTs 101, 102, and 103 can output. The input voltage to the trigger part 130 is the voltage of the capacitor 121. The capacitor 131 stores charge in a voltage lower than the capacitor 121 determined by the ratio between the resistances 132 and 133. If the voltage generated in the capacitor 131 by the stored charge becomes higher than the drive voltage of the thyristor 134, the thyristor 134 becomes an ON state (short circuit state). The charge stored in the capacitor 121 flows through the trip coil 141, and the magnetic field generated by the trip coil 141 opens the switchgear 142. The follow current is blocked according to such a procedure. A voltage $V_{131}$ generated in the capacitor 131 is expressed by the following formula.

$$V_{131} = V_{121} \cdot \frac{R_{132}}{R_{132} + R_{133}} \quad (1)$$

$V_{121}$ denotes a voltage of the capacitor 121, $R_{132}$ denotes a resistance value of the resistance 132, and $R_{133}$ denotes a resistance value of the resistance 133. After defining that the "charge that can be stored in the charging part (capacitor 121) by the lightning surge current" is Q, the capacitance of the capacitor 121 is C, and the voltage of the capacitor 131 that turns on the thyristor 134 is $S_{131}$, $$S_{131} > \frac{Q}{C} \cdot \frac{R_{132}}{R_{132} + R_{133}} \quad (2)$$

designing the capacity of the capacitor 121 and the resistance values of the resistance 132 and the resistance 133 so as to satisfy the formula enables to design not to turn on the thyristor 134 by the "charge that can be stored in the charging part by the lightning surge current". Designing this way enables to flow the lightning surge current and block the follow current.

Figure 2:
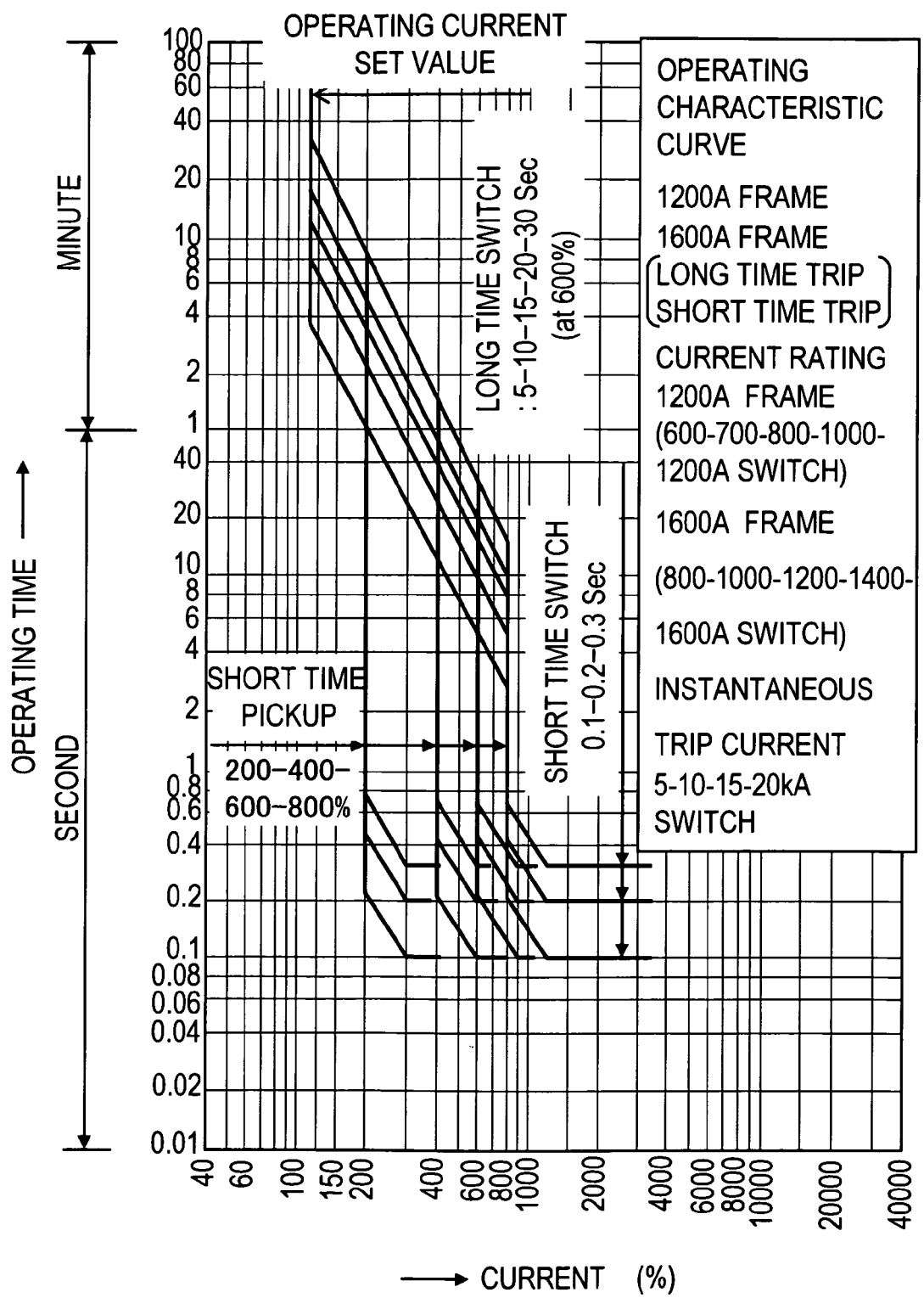
FIG. 2 is a diagram showing operating characteristics of the circuit breaker.
Figure 3:
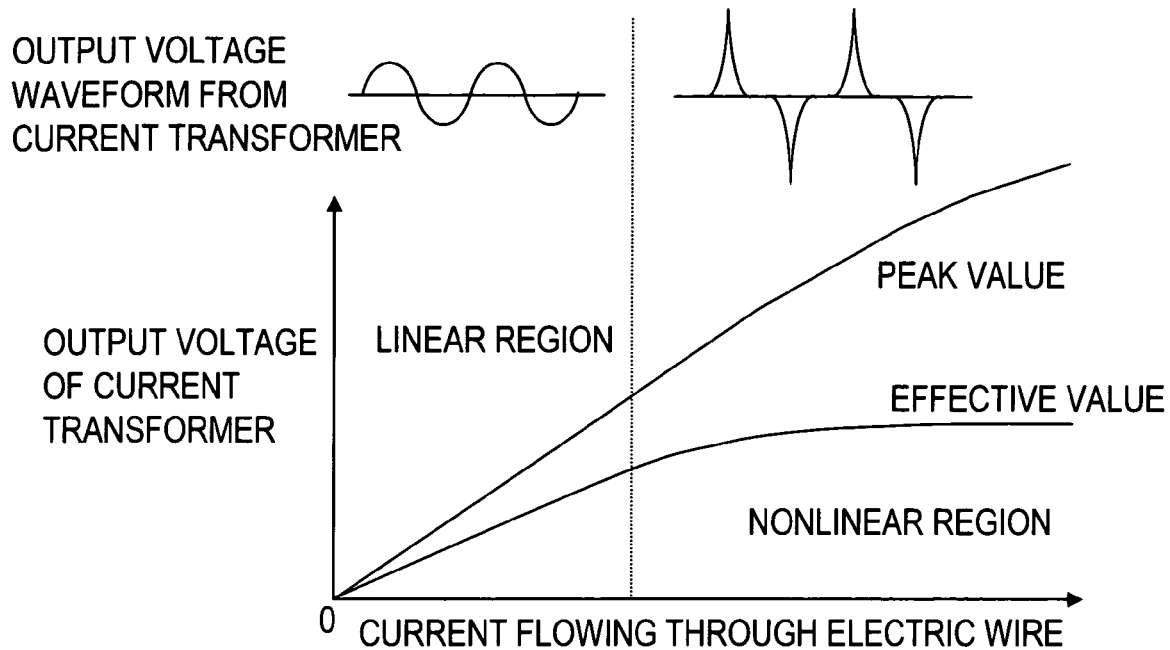
FIG. 3 is a diagram showing a relationship between the current flowing through an electric wire and the output voltage when the load impedance is connected to a current transformer.
Figure 4A:
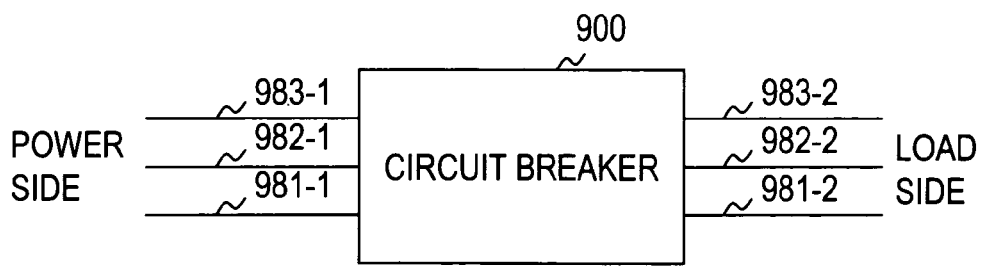
FIG. 4A is a diagram showing an installation method of the circuit breaker.
Figure 4B:
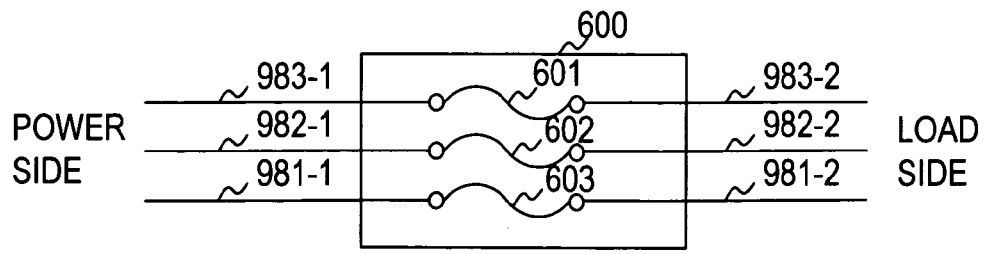
FIG. 4B is a diagram showing an installation method of a fuse.
Figure 5:
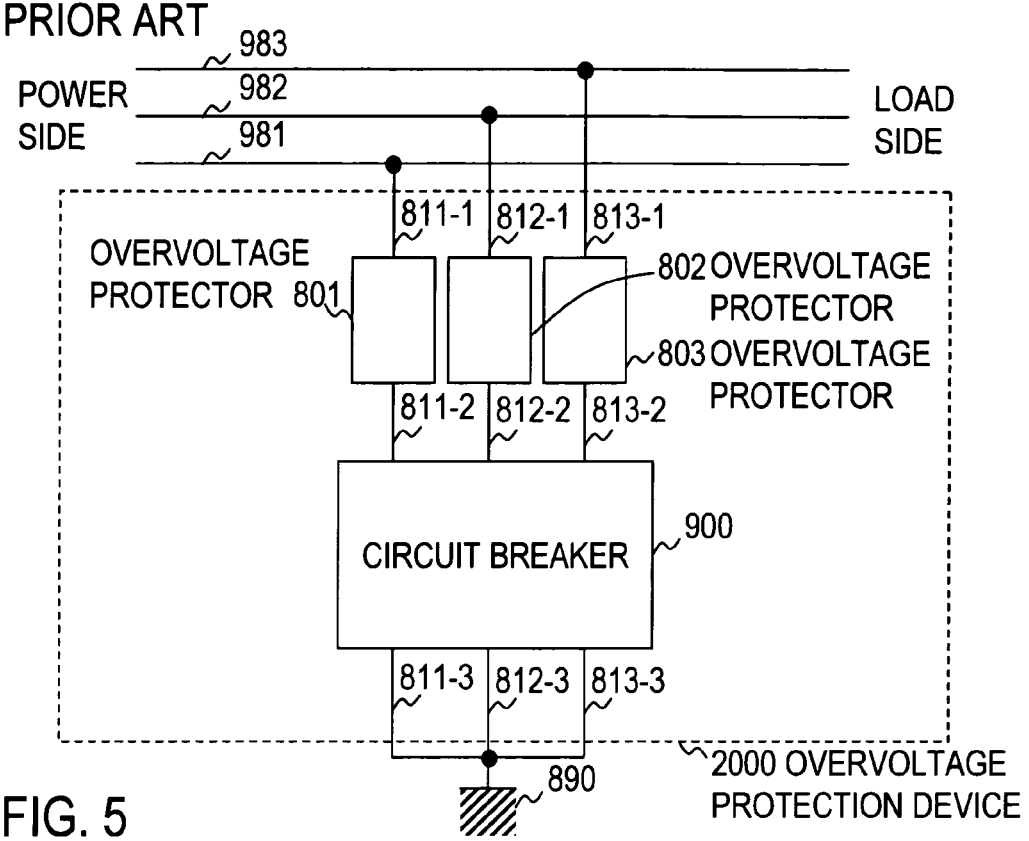
FIG. 5 is a diagram showing an example of constituting an overvoltage protection device by combining the circuit breaker with overvoltage protectors.
Figure 6:
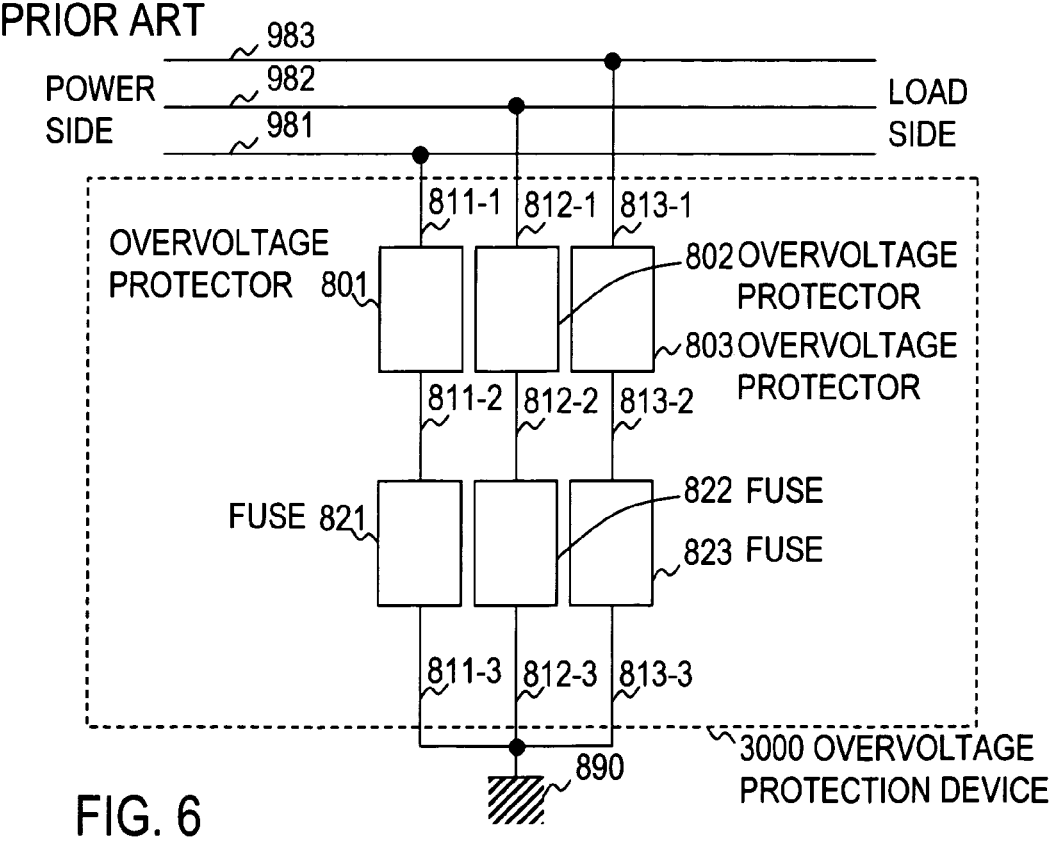
FIG. 6 is a diagram showing an example of constituting an overvoltage protection device by combining the fuses with the overvoltage protectors.
Figure 7:
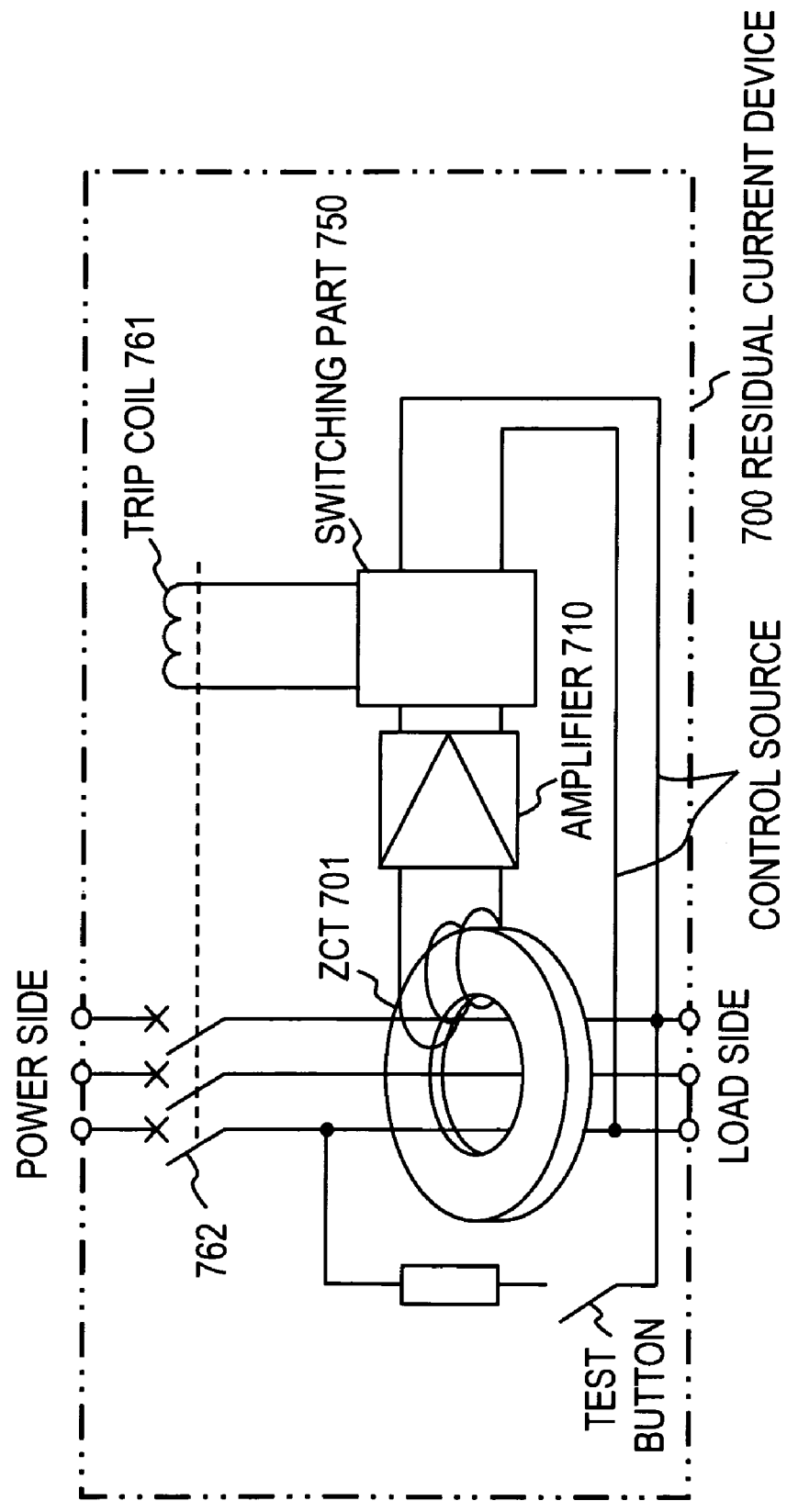
FIG. 7 is a diagram showing a functional configuration example of a residual current device.

Since the disconnector 100 operates in a procedure as described above, sufficient current needs to be applied to the trip coil 141 to surely operate the switchgear 142. To apply sufficient current to the trip coil 141, a sufficient amount of charge needs to be stored in the capacitor 121. To store a sufficient amount of charge in the capacitor 121, it is better that the voltage generated in the CT be larger. As shown in the characteristics of the current transformer (CT) in FIG. 3, in the nonlinear region of the current transformer, the effective value does not increase so much as the current increases, but the peak value continues to increase. Because the disconnector 100 of the present invention does not have to have detailed operating characteristics as the circuit breaker 900 (FIGS. 1 and 2), it is not necessary to stick to the linearity of the output voltage of the CT. It is sufficient if the peak value of the output voltage is increased. Thus, operation in the nonlinear region is possible, and the peak voltage can be utilized after miniaturizing the CT (miniaturizing the core). Therefore, both effects of increasing the output voltage from the CT and miniaturizing the CT can be obtained.

The maximum value of the voltage of the capacitor 121 is an output peak voltage $V_{CT}$ of CT. Therefore, when the output peak voltage $V_{CT}$ of CT satisfies the following formula, the voltage of the capacitor 131 does not rise up to the voltage that can operate the thyristor 134.

$$V_{CT} < S_{131} \cdot \frac{R_{132} + R_{133}}{R_{132}} \quad (3)$$

Thus, even if there is a follow current in a range satisfying this formula, the disconnector 100 cannot block the follow current.

For example, a coil having a silicon steel sheet core 20 mm in dimension and having 3000 turns is used for the CT. The capacitance of the capacitor 121 is set to 17 μF, the capacitance of the capacitor 131 is set to 0.47 μF., the resistance value of the resistance 132 is set to 4.7 kΩ, and the resistance value of the resistance 133 is set to 2.2 kΩ. Such a disconnector 100 does not operate in a 15 kA lightning surge current, and it is verified that 2 A or higher follow current can be blocked. Short circuit breaking of about 10 kA is also possible. Furthermore, the CT can be miniaturized. Furthermore, the overvoltage protection device can be constituted in combination with overvoltage protectors for 15 kA. In this example, although 50 kA lighting surge cannot be handled, 15 kA lighting surge can be handled which is higher than 10 kA lightning surge that could be conventionally handled. Furthermore, although 20 A follow current could not be blocked conventionally, the disconnector of the present invention can even block a follow current of about 2 A.

Second Embodiment

Figure 14:
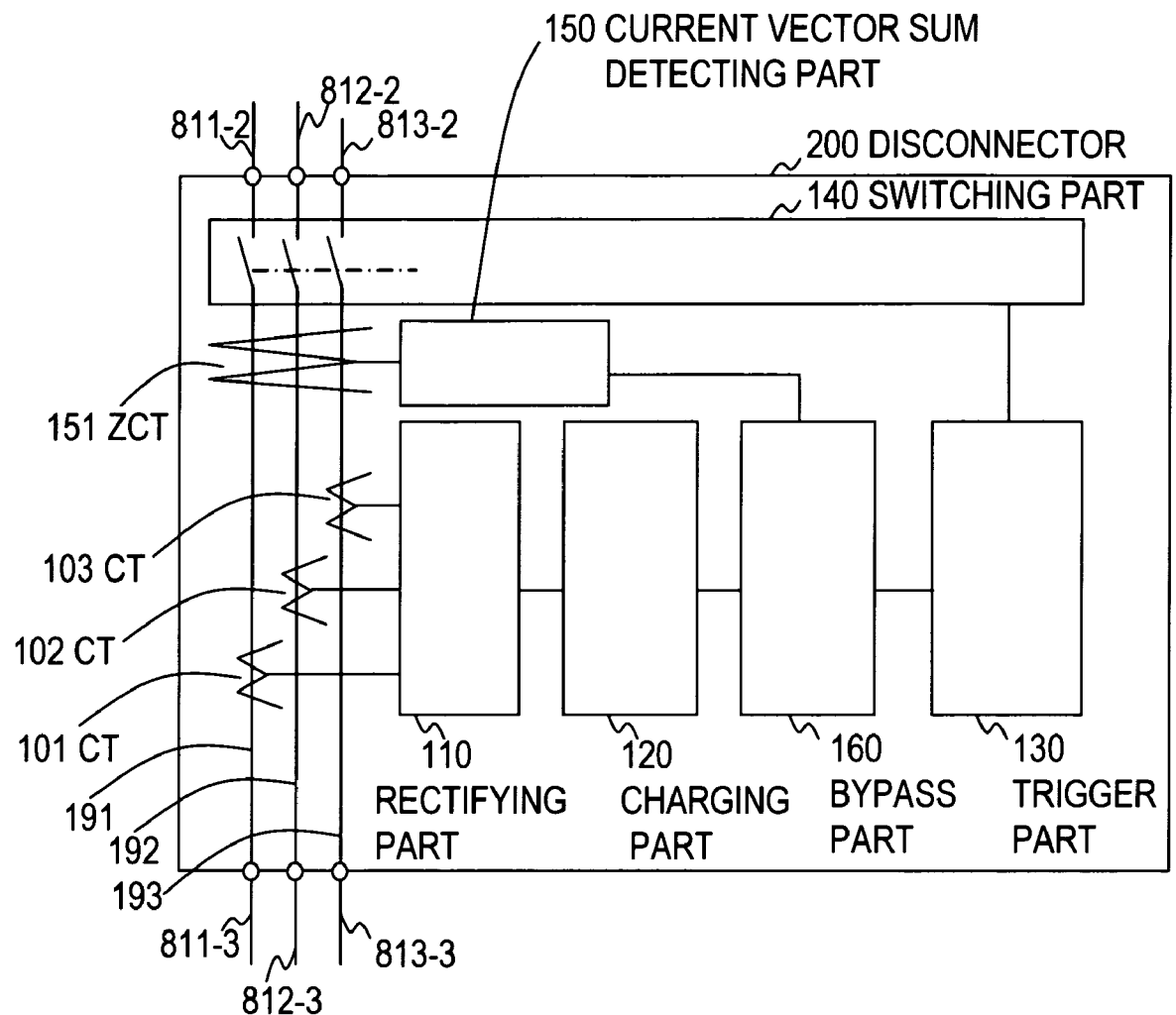
FIG. 14 is a diagram showing a functional configuration example of a disconnector of a second embodiment.

FIG. 14 shows a functional configuration example of a disconnector of a second embodiment. A disconnector 200 is constituted by adding a zero phase current transformer (ZCT) 151, a current vector sum detecting part 150, and a bypass part 160 to the disconnector 100 (first embodiment) shown in FIG. 11. The ZCT 151 detects the vector sum of the currents flowing through the electric wires 191, 192, and 193. The vector sum of the currents is a sum including the directions. For example, if the same current is flown through the electric wires 191 and 192 in the opposite directions, the vector sum is 0 (the same as the current is not flowing). Therefore, if a current that only flows on the ground side, such as a lightning surge current, is flown, a high output voltage appears at the output terminal of the ZCT 151. There is almost no output voltage of the ZCT in case of the follow current due to the interphase short circuit shown in FIG. 10. Since the current originally flowing is low in case of the earth fault shown in FIG. 9, the output voltage is low that is clearly different from the lightning surge current. The bypass part 160 bypasses the current outputted from the rectifying part 110 so that the charge is not stored in the charging part 120. The current vector sum detecting part 150 puts the bypass part 160 into a state that the charge cannot be stored in the charging part 120 if the output voltage of the ZCT 151 is in a predetermined range. The predetermined range is a range that the output voltage from the ZCT 151 can be clearly determined as a lightning surge current.

Because of such a functional configuration, a high voltage is outputted from the ZCT 151 when a large current flows only on the ground side, such as a lightning surge current. The current vector sum detecting part 150 sets up the bypass part 160 to bypass the current outputted from the rectifying part 110. Therefore, the charge is not stored in the charging part 120, and the switching part 140 does not disconnect the electric wires. On the other hand, in case of the follow current caused by the interphase short circuit shown in FIG. 10 or in case of the earth fault shown in FIG. 9, the output voltage from the ZCT 151 is low. Therefore, the current vector sum detecting part 150 sets up the bypass part 160 not to bypass the current outputted from the rectifying part 110. In this state, the current outputted from the rectifying part 110 is stored in the charging part 120, and if the stored charge exceeds a certain value, the trigger part 130 operates the switching part 140 to disconnect the electric wires.

Figure 15:
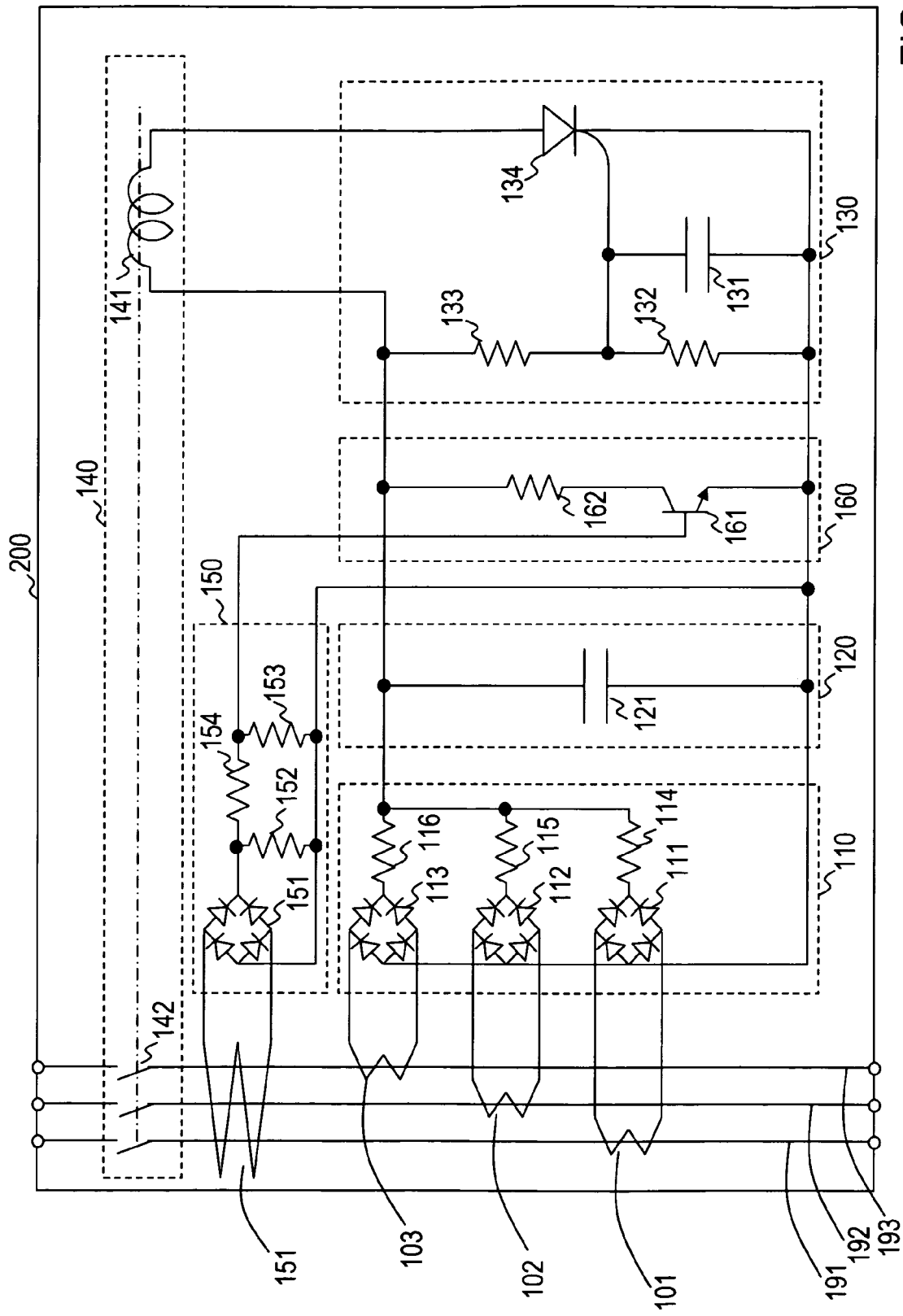
FIG. 15 is a diagram showing a specific configuration example of the disconnector of the second embodiment.

FIG. 15 is a diagram showing a specific configuration example of the disconnector 200. The current vector sum detecting part 150 is constituted by a diode 151 and resistances 152, 153, and 154. The bypass part 160 is constituted by a transistor 161 and a resistance 162.

There is no or little output voltage from the ZCT 151 when there is no lightning surge current, so the output voltage from the current vector sum detecting part 150 is low. Therefore, the transistor 161 is OFF, and the current does not flow through the bypass part 160. Thus, the output current from the rectifying part 110 generated by the follow current is stored in the charging part 120. When the lightning surge current flows, the output voltage of the current vector sum detecting part 150 becomes higher than the operating voltage of the transistor 161. The transistor 161 then turns on, and the current flows through the bypass part 160. Therefore, the output current from the rectifying part 110 generated by the lightning surge current is hardly stored in the charging part 120. Thus, in the present embodiment, the value of Q (charge that can be stored in the charging part by the lightning surge current) shown in Formula (2) is very small. Therefore, Formula (2) can be satisfied even if the capacitance C of the capacitor 121 is set small.

In case of the disconnector 100 (first embodiment), because the charge generated by the lightning surge current is also stored in the capacitor 121, the capacitance of the capacitor 121 needs to be enlarged to some extent. However, if the capacitance of the capacitor 121 is enlarged, the time until blocking is long, because the switchgear 142 is not operated until the charge is stored by the follow current. The follow current can be blocked quicker than the first embodiment because the disconnector 200 can set the capacitance of the capacitor 121 to the minimum capacitance that the trip coil 141 operates the switchgear 142.

The disconnector 100 also blocks the lightning surge current if the charge that operates the switchgear 142 is stored in the capacitor 121 only by the lightning surge current. Since the bypass part 160 of the disconnector 200 does not store the output current from the CTs 101, 102, and 103 generated by the lightning surge current in the charging part 120, there is no fear that the lightning surge current operates the switchgear 142.

For example, a coil having a silicon steel sheet core 30 mm in dimension and having 6000 turns is used for the ZCT. A coil having a silicon steel sheet core 20 mm in dimension and having 3000 turns is used for the CT. The capacitance of the capacitor 121 is set to 17 µF, the capacitance of the capacitor 131 is set to 0.47 µF, the resistance value of the resistance 132 is set to 4.7 kΩ, the resistance value of the resistance 133 is set to 2.2 kΩ, and the resistance value of the resistance 162 is set to 6 kΩ. Such a disconnector 200 does not operate under the lightning surge current of 50 kA and can block a 2 A or higher follow current. Even a 2 A follow current can be blocked in five seconds. Short circuit breaking of about 10 kA is also possible. Furthermore, the overvoltage protection device can be constituted in combination with overvoltage protectors for 50 kA.

Third Embodiment

Figure 16:
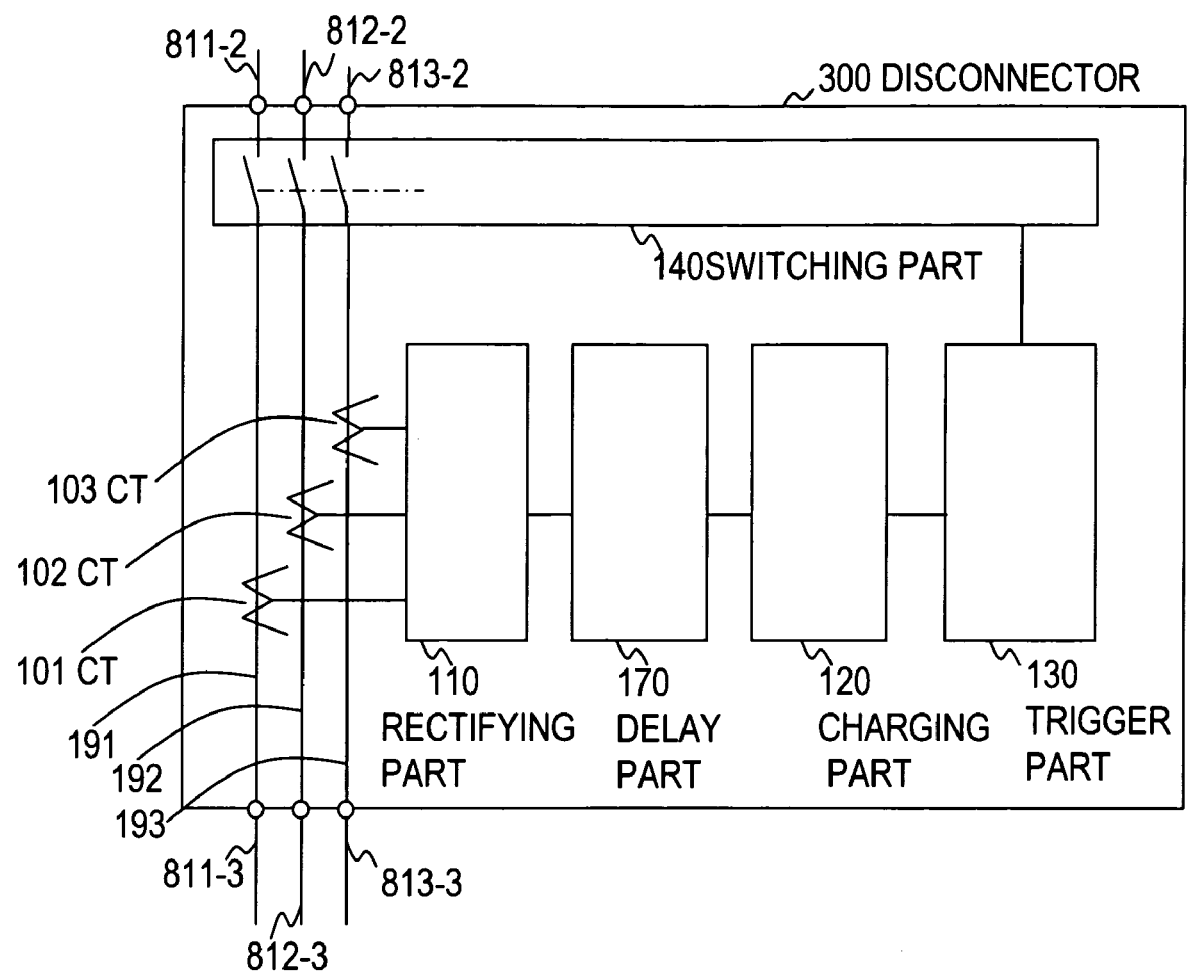
FIG. 16 is a diagram showing a functional configuration example of a disconnector of a third embodiment.

FIG. 16 shows a functional configuration example of a disconnector of a third embodiment. The disconnector 300 is constituted by adding a delay part 170 to the disconnector 100 (first embodiment) shown in FIG. 11. When the lightning surge current flows, the delay part 170 slightly delays the timing that the charging part 120 starts to charge the current from the rectifying part 110. In the second embodiment shown in FIG. 14, the current vector sum detecting part 150 and the bypass part 160 are used to prevent the current from the rectifying part 110 by the lightning surge current from being charged to the charging part 120. In the present embodiment, the timing that the charging part 120 starts charging is delayed to prevent the current from the rectifying part 110 by the lightning surge current from being charged to the charging part 120. In this way, preventing the current from the rectifying part 110 by the lightning surge current from being charged to the charging part 120 to obtain the same effects as the second embodiment.

Figure 17:
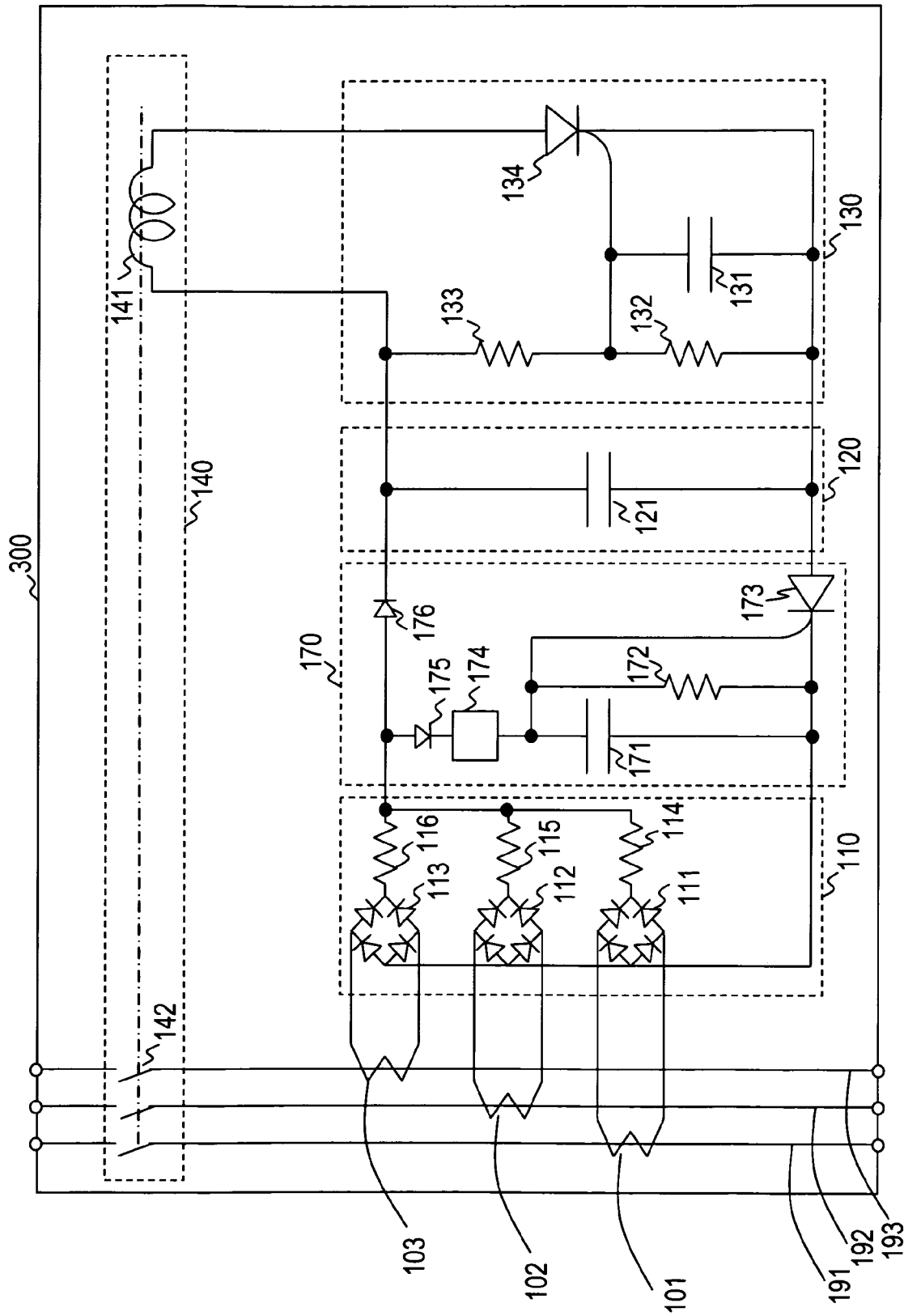
FIG. 17 is a diagram showing a specific configuration example of the disconnector of the third embodiment.
Figure 18A:
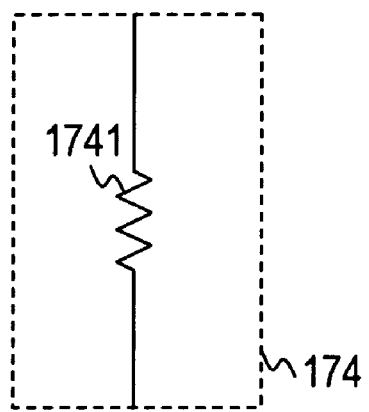
FIG. 18A is a diagram showing a configuration example of a current limiting circuit using a resistance.
Figure 18B:
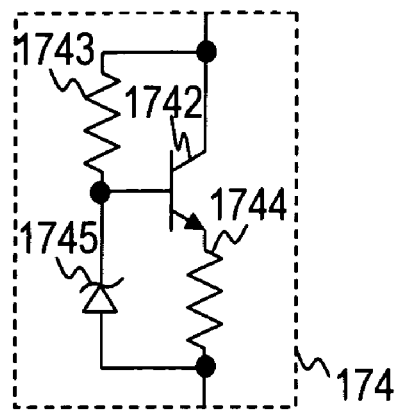
FIG. 18B is a diagram showing a configuration example of the current limiting circuit using a transistor.
Figure 18C:
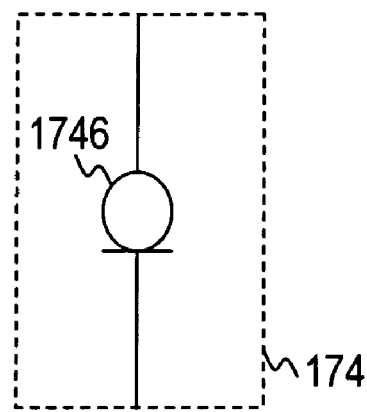
FIG. 18C is a diagram showing a configuration example of the current limiting circuit using a constant current diode.

FIG. 17 shows a specific configuration example of the disconnector 300. The delay part 170 is constituted by a capacitor 171, a resistance 172, a thyristor 173, a current limiting circuit 174, and diodes 175 and 176. FIGS. 18A, 18B, and 18C show examples of the current limiting circuit 174. In FIG. 18A, a resistance limits the current. FIG. 18B shows an example of a constant current circuit using a transistor 1742. FIG. 18C is an example using a constant current diode 1746. In FIGS. 18B and 18C, the setting accuracy of delay time can be raised.

When the lighting surge is not generated, there is no output current from the rectifying part 110, and the charge of the capacitor 171 is 0. Therefore, the thyristor 173 is OFF, and the current from the rectifying part 110 does not flow through the charging part 120. When the lightning surge is generated, the current from the rectifying part 110 is charged to the capacitor 171 through the current limiting circuit 174. When the voltage of the capacitor 171 exceeds a predetermined value, the thyristor 173 is turned on. The time from the generation of the lightning surge current to the turning on of the thyristor 173 is a delay generated by the delay part 170. If the current value of the current limiting circuit 174 and the capacity of the capacitor 171 are designed so that the delay time is several 100

μseconds, the current from the rectifying part 110 by the lightning surge current is not charged to the charging part 120. The resistance 172 is arranged to discharge the charge of the capacitor 171 to return the thyristor 173 to the initial OFF state when there is no more lightning surge current. The diodes 175 and 176 are arranged to prevent the backflow.

When the thyristor 173 is turned on, the current from the rectifying part 110 is also charged to the capacitor 121 of the charging part 120. However, the current is not charged to the capacitor 121 if there is no follow current. Therefore, the switching part 140 is not driven. On the other hand, the charge is stored in the capacitor 121 if there is a follow current. When the charge stored in the capacitor 121 exceeds a predetermined value, the trigger part 130 drives the switching part 140, and the electric wires are disconnected.

In the present embodiment, the value of Q (charge that can be stored in the charging part by the lighting surge current) shown in Formula 2 is very small as in the second embodiment. Therefore, the capacitance C of the capacitor 121 can also be made small, and the same effects as the second embodiment can be obtained.

Fourth Embodiment

Figure 19A:
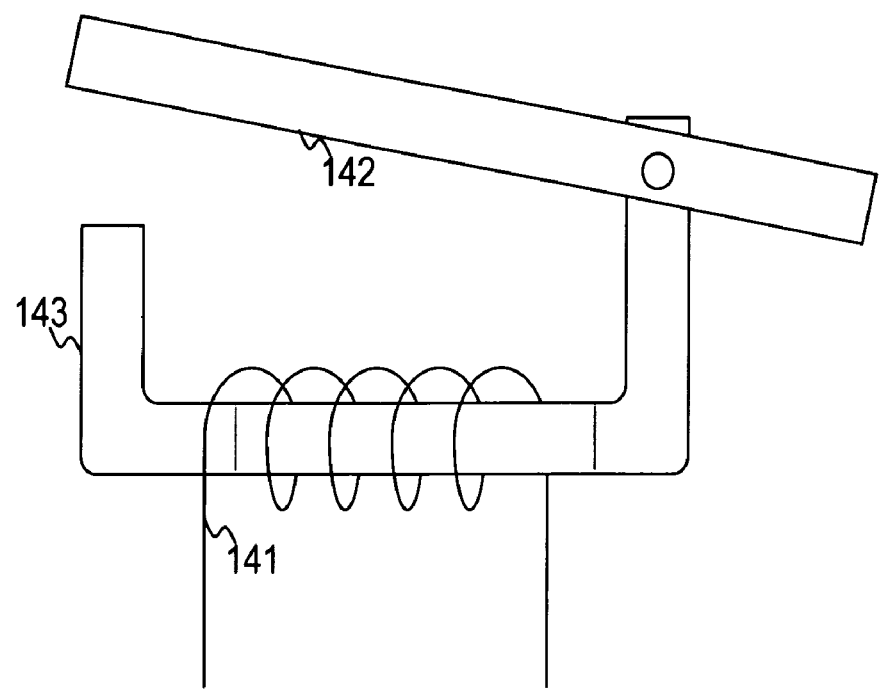
FIG. 19A is a diagram showing a specific configuration example of a switching part not using a permanent magnet.
Figure 19B:
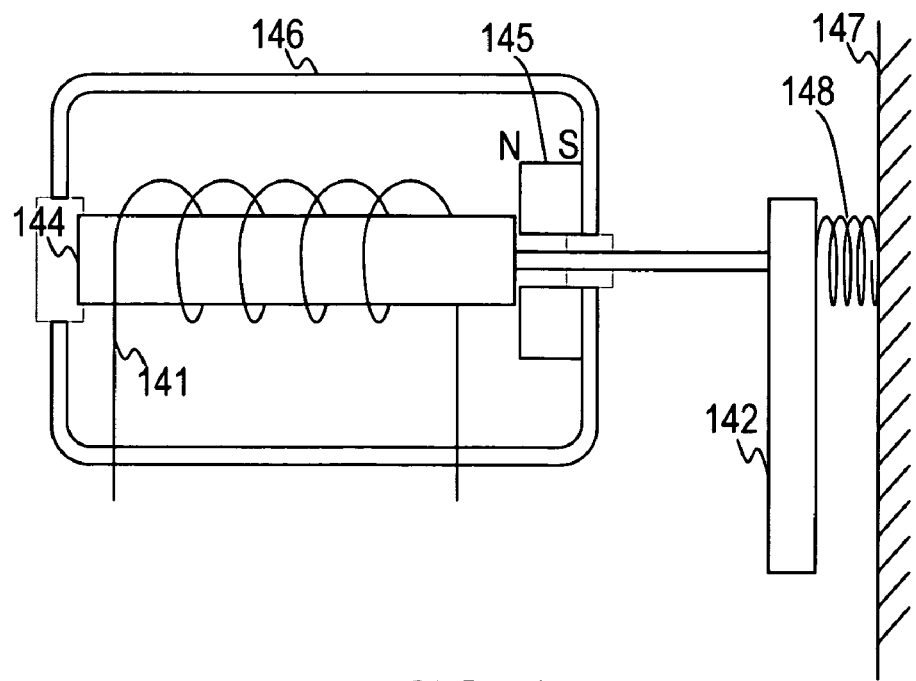
FIG. 19B is a diagram showing a specific configuration example of the switching part using a permanent magnet.

FIGS. 19A and 19B show specific configuration examples of the switching part 140. The switching part 140 of FIG. 19A is constituted by the trip coil 141, the switchgear 142, and a magnetic frame 143. After a current is applied to the trip coil 141, the magnetic frame 143 works as a magnet and operates the switchgear 142. The switching part 140 of FIG. 19B is constituted by the trip coil 141, the switchgear 142, an iron core 144, a permanent magnet 145, a magnetic frame 146, a fixed part 147, and a spring. (elastic body) 148. The iron core 144 is connected to the switchgear 142. When the current is not flowing through the trip coil 141, the iron core 144 is attracted to the permanent magnet 145. When a current that generates a magnetic field in the opposite direction of the permanent magnet 145 flows through the trip coil 141, the magnetic field is canceled, and the iron core 144 is not attracted to the permanent magnet 145. At this point, the spring 148 pulls away the iron core 144 from the permanent magnet 145.

Actual mounting of the disconnector will now be described. Since the switchgear 142 is driven by the magnetic force generated by the trip coil 141, the switchgear 142 is arranged near the trip coil 141. Since the switchgear 142 is a mechanism that opens and closes the electric wires 191, 192, and 193, the switchgear 142 is arranged near the electric wires 191, 192, and 193. Therefore, the trip coil 141 is also arranged near the electric wires 191, 192, and 193. Furthermore, the constituting parts of the disconnector are densely mounted for miniaturization.

Because of the arrangement, when a current flows through all or part of the electric wires 191, 192, and 193 by the lightning surge and the magnetic field is generated, the trip coil 141 is placed in the magnetic field. In case of the switching part of FIG. 19A, the switchgear 142 may open even if the current is not flowing through the trip coil 141. In case of the switching part of FIG. 19B, there would be fewer malfunctions than in the switching part of FIG. 19A, but malfunctions may still occur.

Thus, in the present invention, the switching part of FIG. 19B is used to generate, in the trip coil 141, a magnetic field in the same direction as the permanent magnet 145 when the current flows through all or part of the electric wires 191, 192, and 193 by the lightning surge. Therefore, since the iron core 144 is strongly attracted to the permanent magnet 145, there is no fear of malfunction.

Figure 20:
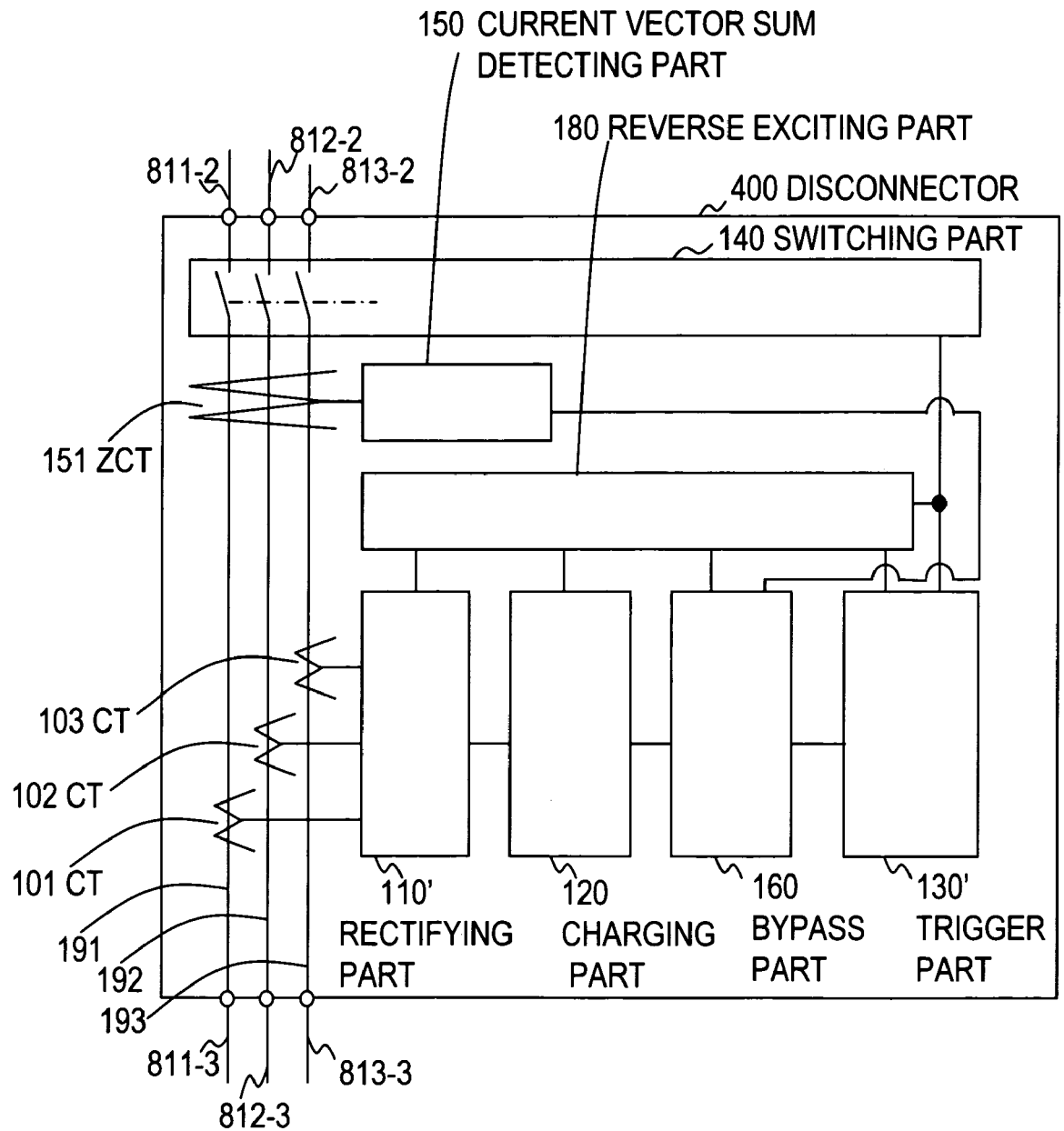
FIG. 20 is a diagram showing a functional configuration example of a disconnector of a fourth embodiment.

FIG. 20 shows a functional configuration example of a disconnector of a fourth embodiment. A disconnector 400 is characterized by using the switching part 140 shown in FIG. 19B and adding a reverse exciting part 180 to the disconnector 200 (second embodiment) shown in FIG. 14. By adding the reverse exciting part 180, minor changes are made to a rectifying part 110' and a trigger part 130'. In addition to the functions of the rectifying part 110, the rectifying part 110' includes a function of supplying a current to the reverse exciting part 180 when the current flows through all or part of the electric wires 191, 192, and 193 by the lightning surge. The reverse exciting part 180 supplies a current to the switching part 140 so that the switch is closed. The trigger part 130' is constituted such that the current supplied to the switching part 140 by the reverse exciting part 180 is not inputted.

Figure 21:
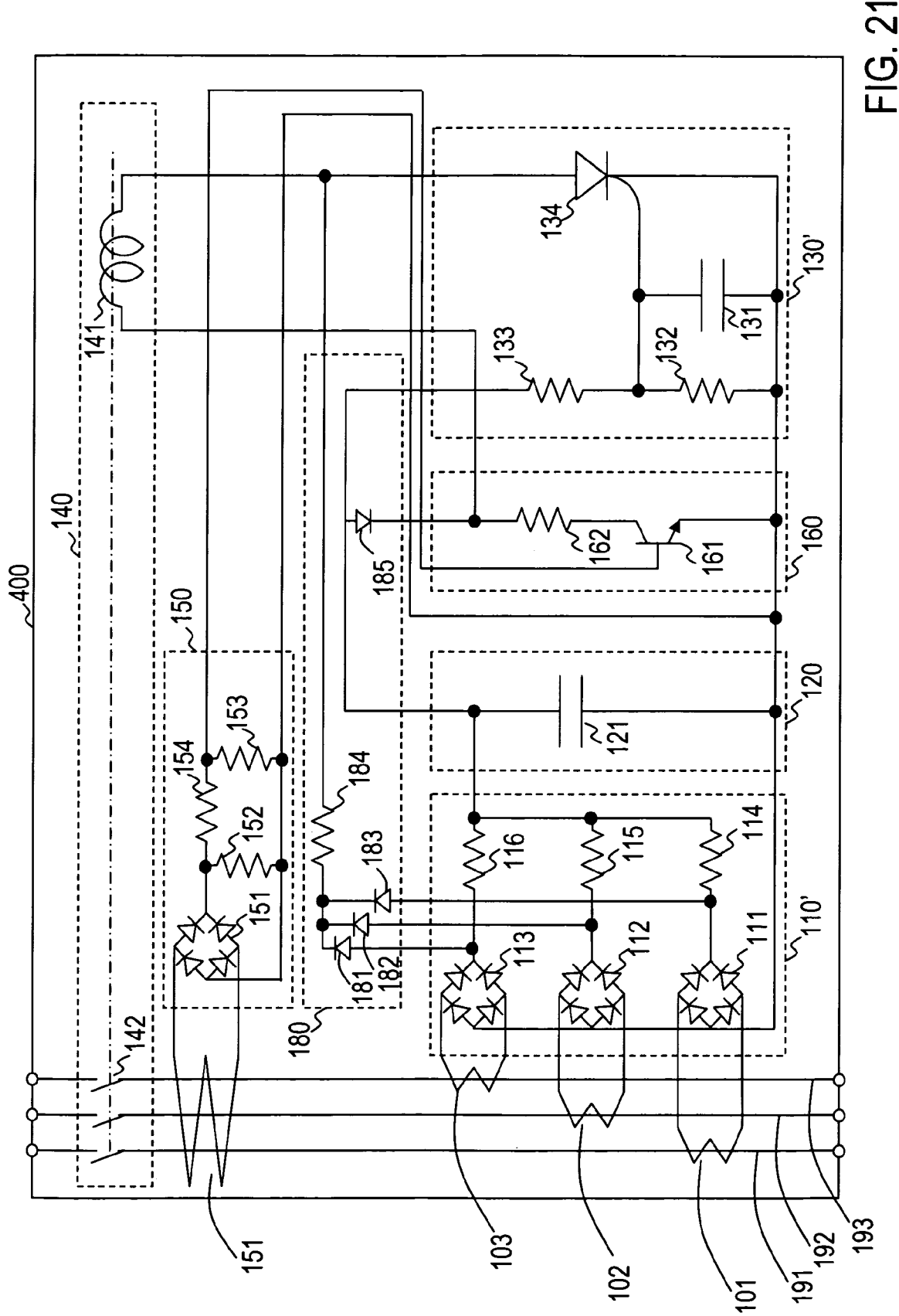
FIG. 21 is a diagram showing a specific configuration example of the disconnector of the fourth embodiment.

FIG. 21 shows a specific configuration example of the disconnector 400. The reverse exciting part 180 is constituted by diodes 181, 182, and 183, a resistance 184, and a diode 185. The diodes 181, 182, and 183 rectify and add up the current from the rectifying part 110'. The resistance 184 adjusts the amount of current applied to the trip coil 141. The diode 185 is for backflow prevention and allows only the charging part 120 to supply the current to be supplied to the trigger part 130'. The wiring of the rectifying part 110' is configured to be able to supply, after rectification, part of the current to be supplied to the charging part 120 to the reverse exciting part 180. The wiring of the trigger part 130' is configured to supply the current to the resistance 133 only from the charging part 120.

When the lightning surge current flows, the output voltage of the current vector sum detecting part 150 becomes higher than the operating voltage of the transistor 161. The transistor 161 is then turned on. The current flows from the reverse exciting part 180 to the trip coil 141. The direction of the current is opposite the current flowing from the charging part 120 to the trip coil 141. Therefore, the switchgear 142 can strongly maintain the closed state against the lightning surge current. For example, if the resistance 184 is 33Ω when the wirewound resistor of the trip coil 141 is 30Ω, the switchgear 142 can be closed with a backward current that is more than twice the forward current (current in the direction that the switchgear 142 opens) in a 20 kA lighting surge.

In case of the follow current, since the output voltage of the current vector sum detecting part 150 is lower than the operating voltage of the transistor 161, the current does not flow from the reverse exciting part 180 to the trip coil 141. If sufficient charge is stored in the capacitor 121 of the charging part 120 and the thyristor of the trigger part 130' is turned on, the current flows through the trip coil 141, and the switchgear 142 is disconnected.

Such a configuration of the disconnector 400 enables to surely flow the lightning surge current and block the follow current without the switchgear 142 malfunctioning.

What is claimed is:
1. A disconnector for a plurality of electric wires, comprising:
    one or a plurality of current transformers that detect a current flowing through the electric wires, respectively;
    a rectifying part that rectifies the current outputted from the current transformers;
    a charging part that charges the current outputted from the rectifying part;

a switching part that is connected in series to the electric wires and that disconnects the electric wires upon driving;

a trigger part that drives the switching part when the charge stored in the changing part becomes a predetermined drive area;

a zero phase current transformer that detects the vector sum of the currents flowing through the plurality of electric wires;

a bypass part that can set a state in which the charge is not stored in the charging part; and a current vector sum detecting part that puts the bypass part in a state in which the charge is not stored in the charging part when the output of the zero phase current transformer is in a predetermined range, wherein the drive area is set larger than the charge that can be stored in the charging part by a lightning surge current.

2. The disconnector according to claim 1, wherein in the current transformers, when the current flowing in the electric wires is in a range that the trigger part drives the switching part, the relationship between the current and the voltage outputted from the current transformers is nonlinear.

3. The disconnector according to claim 1, wherein the switching part is operated by a current that discharges the charge stored in the charging part.

4. The disconnector according to claim 2, wherein the switching part is operated by a current that discharges the charge stored in the charging part.

5. The disconnector according to any one of claims 1, 2, 3 and 4 further comprising a reverse exciting part that supplies the current outputted from the rectifying part to the switching part to make the electric wires conductive when the bypass part is setting the state in which the charge is not stored in the charging part.

6. An overvoltage protection device comprising:

a plurality of overvoltage protectors that release a lightning surge current;

a plurality of electric wires that are connected to the overvoltage protectors respectively and that release the lightning surge current;

current transformers that detect the current flowing through the electric wires respectively;

a rectifying part that rectifies the current outputted from the current transformers;

a charging part that charges the current outputted from the rectifying part;

a switching part that is connected in series to the electric wires and that disconnect the electric wires upon driving;

a trigger part that drives the switching part when the charge stored in the changing part becomes a predetermined drive area;

a zero phase current transformer that detects the vector sum of the currents flowing through the plurality of electric wires;

a bypass part that sets a state in which the charge is not stored in the charging part; and a current vector sum detecting part that puts the bypass part in a state in which the charge is not stored in the charging part when the output of the zero phase current transformer is in a predetermined range, wherein the drive area is set larger than the charge that is stored in the charging part by the maximum lightning surge current that the overvoltage protectors can handle.

7. The overvoltage protection device according to claim 6, wherein in the current transformers, when the current flowing through the electric wires is in a range that the trigger part drives the switching part, the relationship between the current and the voltage outputted from the current transformers is nonlinear.

8. The overvoltage protection device according to claim 6, wherein the switching part is operated by current that discharges the charge stored in the charging part.

9. The overvoltage protection device according to claim 7, wherein the switching part is operated by current that discharges the charge stored in the charging part.

10. The overvoltage protection device according to any one of claims 6, 7, 8 and 9, further comprising a reverse exciting part that supplies the current outputted from the rectifying part to the switching part to make the electric wires conductive when the bypass part is setting the state in which the charge is not stored in the charging part.

* * * * *